United States Patent [19] [11] 4,324,840
Katz [45] Apr. 13, 1982

[54] ADSORPTION DECAFFEINATION
[75] Inventor: Saul N. Katz, Monsey, N.Y.
[73] Assignee: General Foods Corporation, White Plains, N.Y.
[21] Appl. No.: 159,725
[22] Filed: Jun. 16, 1980
[51] Int. Cl.³ .............................. A23F 3/38; A23F 5/22
[52] U.S. Cl. ..................................... 426/422; 426/423; 544/274
[58] Field of Search ................... 544/274; 426/422, 423
[56] References Cited
U.S. PATENT DOCUMENTS

| | | | |
|---|---|---|---|
| 4,113,886 | 9/1978 | Katz | 426/422 |
| 4,113,887 | 9/1978 | Kramer et al. | 426/422 |
| 4,113,888 | 9/1978 | Henig et al. | 426/422 |
| 4,160,042 | 7/1979 | Farr et al. | 426/422 X |
| 4,237,288 | 12/1980 | Rieshmore | 426/422 X |

FOREIGN PATENT DOCUMENTS 1516208  6/1978  United Kingdom ................ 426/424

Primary Examiner—Joseph M. Golian
Attorney, Agent, or Firm—Thomas V. Sullivan; Thomas R. Savoie; Bruno P. Struzzi

[57] ABSTRACT

The process disclosed herein decaffeinates an aqueous caffeine solution by contacting it with a solid caffeine adsorbent which is made more selective to caffeine by a thin layer of a water-immiscible, caffeine-specific solvent. The caffeine is selectively extracted from the aqueous solution, leaving the solubles necessary for a good tasting beverage, by the solid adsorbent. Because the solvent is selective, the coated adsorbent likewise shows selectivity.

10 Claims, No Drawings

ADSORPTION DECAFFEINATION

DESCRIPTION

TECHNICAL FIELD

The present invention relates to decaffeination, and more particularly to an improved process for decaffeinating an aqueous caffeine solution by contacting it with an improved solid extractant.

The prior art has long sought a process which can effectively and non-destructively remove caffeine from aqueous solutions, especially vegetable extracts from tea, coffee, and the like. All of the known procedures have at least two common problems. First, they add cost to the final product, and it would be desirable to reduce that cost as much as possible. Secondly, they all affect the flavor and quality of the final product by either altering the chemical profile of the natural ingredients or possibly by leaving minor residues. Therefore, it would be desirable to provide an alternative procedure which is more economical than known technology for producing products of like or improved flavor and quality.

BACKGROUND ART

Decaffeination by commercial techniques often involves solvent extraction from whole green beans such as described by Patel et al. in U.S. Pat. No. 3,671,263 who use a chlorinated hydrocarbon solvent, and by Berry et al. in U.S. Pat. No. 2,309,092 who use a caffeine-deficient solution of coffee solubles. Also of commercial importance is the extraction of caffeine from aqueous solutions with a water-immiscible solvent as described by Adler et al. in U.S. Pat. No. 2,933,395. However, each of these procedures affect the quality of the beverage and there is an effort being made to enable the use of alternative solvents or eliminate the need for solvent/product contact. For example, in Belgian Pat. No. 835,556, there is disclosed a process wherein aqueous caffeine solutions are contacted with liquid, water-immiscible fatty extractants at ratios of liquid extractant to caffeine solution of about 20:1. The high volumes of extractant seriously detract from the commercial utility of such a process because of the high added costs.

In an alternative to the use of highly caffeine-specific solvents, Katz suggests in U.S. Pat. No. 4,113,886 that a selective membrane can be employed to effect separation. The solvent functions only to transfer the caffeine from the feed solution to an aqueous phase for collecting the extracted caffeine.

As a total alternative to liquid extractants, a number of patents teach solid adsorbents. For example, U.K. Pat. No. 1,488,340 describes removing caffeine from an aqueous solution by means of polymeric non-ionogenic adsorption resins. While certain of these resins are effective and produce high quality products, they remain more costly than desired. Other patents, such as U.S. Pat. No. 2,391,981 and U.S. Pat. No. 2,416,484 to Kremers, discuss clay as an adsorbent, however, clay is not satisfactorily selective for commercial use as such. Similarly, the hydrated silicates as disclosed by Grossman in U.S. Pat. No. 2,375,550 remove valuable coffee solids other than caffeine. Other patents, such as U.S. Pat. No. 2,472,881 to Bender, U.S. Pat. No. 2,508,545 to Shuman, and U.S. Pat. No. 4,168,324 to Roselius et al., disclose the attraction of caffeine by activated carbon. However, none of these patents suggest decaffeination of an aqueous extract by direct contact with activated carbon because the activated carbon is not specific to caffeine and picks up many other solids.

Thus, the prior art attempts with liquid extractants need improvement, but the available systems employing solid adsorbents are either too costly or not suitably selective. Accordingly, there is a present need for improvement by means of an alternative process for decaffeination.

DISCLOSURE OF INVENTION

The present invention provides an improved method for decaffeinating an aqueous caffeine-containing solution comprising the steps of: (a) contacting an aqueous caffeine-containing solution with a solid caffeine adsorbent coated with a thin layer of a liquid, water-immiscible, caffeine-specific solvent; (b) maintaining the aqueous caffeine-containing solution in contact with the solid caffeine adsorbent for a time sufficient for at least a portion of the caffeine to be extracted from the aqueous solution and adsorbed by the solid caffeine adsorbent; and (c) separating the aqueous caffeine-containing solution from the solid caffeine adsorbent.

The process is useful for removing caffeine from any aqueous caffeine-containing solution, but finds its primary utility for decaffeinating aqueous vegetable extracts such as coffee and tea. Because of its high specificity for caffeine, the coffee extracts can be from green or roasted beans. Where the extract is from roasted coffee, it is preferred to strip and collect volatile flavors and aromas from the aqueous extract before contacting the extract with the adsorbent for removing the caffeine. Then, the decaffeinated extract can be combined with the collected volatiles and dried to soluble powder form as described in U.S. Pat. No. 2,933,395 to Adler et al. There are envisaged, however, products for which this will not be necessary and alternative processes wherein the volatiles can be removed from the adsorbent.

The liquid, water-immiscible caffeine-specific solvent coated on the solid caffeine adsorbent screens out other valuable materials present in the feed solution, while permitting the caffeine to pass through to the adsorbent where it is adsorbed. An advantage of the invention is that the selectivities of the solvent and the solid adsorbent are additive and tend to be more selective when combined than either would be separately.

Selection of the proper combination of solvent, solid adsorbent, and conditions of contact is important to maintain the most effective driving force and rate of decaffeination. Additionally, it is important to apply the liquid solvent layer as thinly as possible. To accomplish this, the liquid caffeine-specific solvent is preferably dissolved in a suitable carrier solvent such as hexane prior to application to the solid adsorbent. The percentage of caffeine-specific solvent applied to the solid adsorbent should be as low as possible consistent with substantially completely coating the adsorbent after volatilization of the carrier solvent. Typically, the caffeine-specific solvent will comprise from 0.5 to 50% of the coating solution, preferably the level of caffeine-specific will be within the range of from about 1 to 10%, with levels of less than 5% being most preferred. All of these percentages are by weight, based on the weight of the applied solution. The carrier solvent should be selected from those which can be fully removed by heating at temperatures not destructive to the adsorbent or the caffeine-specific solvent.

The caffeine-specific solvent must be a liquid under the proposed processing conditions and must be immiscible in the aqueous caffeine-containing feed solution. It is important for the solvent to be liquid so that the caffeine can be rapidly transferred across the thin layer. The quality of immiscibility is important so that the solvent is not dissolved in the aqueous caffeine-containing solution in any amount which will have a significant impact on the flavor or quality of the final product. Preferably, the caffeine-specific solvent is sufficiently immiscible to prevent any measurable amount of it to be dissolved in the aqueous caffeine-containing solution.

Among the materials which can be employed in forming the caffeine-specific solvent layer according to the present invention are petroleum oils, triglycerides, fatty acids, fatty alcohols and other caffeine-selective, water-immiscible materials which are liquid at the conditions of treatment. The triglycerides can be derived from vegetable or animal sources. Among the suitable triglycerides are the usual vegetable fats typically encountered in food processing, such as soybean oil, corn oil, coconut oil, cottonseed oil, peanut oil, safflower oil, palm kernel oil, sunflower oil, palm oil, rapeseed oil, coffee oil, and mixtures of these. It is preferred that the caffeine-specific solvent have a partition coefficient of at least 0.05, and more preferably greater than 0.1.

While animal fats such as tallow, chicken fat, lard and butter fat can conceivably be employed, they contain large amounts of impurities which are costly to remove. Therefore, they are not preferred. Among the suitable petroleum oils are mineral oils known to the art as light mineral oils. These oils are desirable because they have good stability. Among the fatty acids are oleic acid, stearic acid, octanoic acid, and the like. In general, the longer chain acids will be preferred within this group. Similarly, longer chain fatty alcohols, such as stearyl alcohol, are preferred within that group.

The solid caffeine adsorbent employed in the slurry of the present invention can be selected from any of those known to adsorb caffeine and be physically stable under the conditions of processing. Among the known caffeine adsorbents are clays such as discussed in U.S. Pat. No. 2,391,981 and U.S. Pat. No. 2,416,484 to Kremers; zeolites or ion exchange resins as taught in U.S. Pat. No. 3,108,876 to Turken et al.; hydrated silicates as taught in U.S. Pat. No. 2,375,550 to Grossman; polymeric non-ionogenic adsorption resins, especially styrene divinylbenzene macroreticular resins of the type disclosed by Gustafson in U.S. Pat. No. 3,531,463; activated carbon, especially finely-divided activated carbon derived from coconut or coal. Among these, activated carbon is preferred because of its desirable balance between cost and effectiveness.

The solid adsorbent should have the highest possible surface area consistent with physical strength necessary under the processing conditions and the facility with which it can be separated from the aqueous caffeine-containing solution after contacting for the desired period of time. In the case of activated carbon, especially derived from coal, particle sizes of from 40 mesh to 12 mesh U.S. have been found effective. The natural porosity of these materials further increases their surface area and increases the efficiency with which they remove caffeine from the solvent.

The solid caffeine adsorbent, coated with a layer of a liquid caffeine-specific solvent according to the invention, can be contacted with the aqueous caffeine-containing solution by admixing it batchwise or continuously, or by employing it in a fixed bed and passing the aqueous caffeine-containing solution over it. Typical of a suitable contact apparatus is a packed column. The particular conditions for contact will vary depending upon the solid caffeine adsorbent, the liquid caffeine-specific solvent, the desired degree of caffeine extraction, and like considerations known to the art.

Also important for obtaining good extraction according to the invention is the temperature maintained during contact between the slurry and the aqueous caffeine solution. The temperature will affect the rate of extraction, the selectivity of the solvent, and the capacity of the solid caffeine adsorbent for holding the extracted caffeine. The temperature will also affect the flavor of any desired coffee or tea flavors present in the aqueous solution. Accordingly, it is not possible to identify a single temperature or range of temperatures as universally defining optimum conditions. It is believed, however, that temperatures within the range of from about 25° to about 100° C. will provide good results. The selection of an exact temperature will depend on the materials and processing equipment and conditions employed, and may be within this range or outside of this range.

Total contact time, or residence time within an extractor, will depend upon the factors discussed above as well as the desired degree of caffeine extraction. While economics is the controlling factor, it must be borne in mind that excessively long contact times adversely affect coffee and tea flavors. Those skilled in the art will be able to balance these factors as necessary, given the exemplary situations set forth in the Examples.

BEST MODE FOR CARRYING OUT THE INVENTION

The following Examples are provided to illustrate and explain what is presently considered the best mode for carrying out the invention. The data is for illustrative purposes to guide the person of ordinary skill in the art and is not to be taken as limiting in any regard. Unless otherwise indicated, all parts and percentages are by weight.

EXAMPLE 1

A green coffee extract was prepared, and several portions were decaffeinated by contacting them with separate amounts of DARCO 12×20 grade activated carbon which had a layer of 1 to 20% by weight mineral oil thereon. The layer of the mineral oil was applied by preparing 5, 10, 25 and 50% solutions of mineral oil in n-hexane and heating to 70° C. for 30 minutes to volatilize the n-hexane, or by applying the mineral oil by itself.

The green coffee extracts had total solids contents of 25% and a ratio of total solids to caffeine of 31. Ten grams of each of the separate activated carbon portions were contacted with 100 ml of extract in batch mode at 75° C. The results of the extractions are summarized below:

| Activated Carbon Coating (% mineral oil applied) | Decaffeination Wt. % |
|---|---|
| 100 | 25 |
| 50 | 27 |
| 25 | 50 |
| 10 | 69 |
| 5 | 71 |

EXAMPLE 2

A 10% mineral oil-90% n-hexane solution was contacted with DARCO 12×20 grade activated carbon, was allowed to drain and the hexane was evaporated from the mix. Coated activated carbon (240 grams) was loaded into a column 90 cm by 3.2 cm I.D. Into this column was fed a 1% caffeine solution. The breakthrough curve showed the following:

10 grams caffeine feed for 99% decaffeination
13 grams caffeine feed for 97% decaffeination
15 grams caffeine feed for 95% decaffeination

EXAMPLE 3

DARCO 12×40 activated carbon was coated by immersing in a mixture of 50% lauric acid and 50% methanol, draining excess coating solution and washing with warm water to remove remaining methanol. Twenty parts of the coated activated carbon were added to 100 parts of an aqueous caffeine solution containing 1.2% caffeine. After one hour at 43° C., the caffeine content of the solution was reduced by 51.5%. With no coating, the caffeine would be nearly all removed, but the carbon would not have the requisite selectivity for use in preparing a coffee or tea product.

The above description is for the purpose of describing the invention to people having ordinary skill in the art to enable them to practice it. It is not meant to detail all of the obvious modifications and variations of the invention which will become apparent upon reading. It is intended, however, that these modifications and variations be included within the scope of the invention which is defined by the following claims.

What is claimed is:

1. An improved method for decaffeinating an aqueous caffeine-containing solution comprising the steps of:
    (a) contacting an aqueous caffeine-containing solution with a solid caffeine adsorbent coated with a thin layer of a liquid, water-immiscible, caffeine-specific solvent;
    (b) maintaining the aqueous caffeine-containing solution in contact with the solid caffeine adsorbent for a time sufficient for at least a portion of the caffeine to be extracted from the aqueous solution and adsorbed by the solid caffeine adsorbent; and
    (c) separating the aqueous caffeine-containing solution from the solid caffeine adsorbent.
2. The method of claim 1 wherein the aqueous caffeine-containing solution is a coffee or tea extract.
3. The method of claim 2 wherein the aqueous caffeine-containing solution is a green coffee extract.
4. The method of claim 2 wherein the aqueous caffeine-containing solution is a roasted coffee extract.
5. The method of claim 4 wherein the roasted coffee extract has been stripped of volatiles.
6. The method of claim 1 wherein the solid adsorbent is held in a fixed bed and the aqueous caffeine-containing solution is passed through the bed.
7. The method of claim 6 wherein the temperature during contact is maintained within the range of from 25° to 100° C.
8. The method of claim 1 wherein the solid caffeine adsorbent comprises a member selected from the group consisting of activated carbon, clay, hydrated silicates, zeolites, ion exchange resins, non-ionogenic adsorption resins, and any combination of these.
9. The method of claim 8 wherein the solid caffeine adsorbent comprises activated carbon.
10. The method of claim 1 wherein the liquid, water-immiscible, caffeine-specific solvent comprises a member selected from the group consisting of petroleum oils, fatty acids, fatty alcohols, and triglycerides.

* * * * *